United States Patent
Landais et al.

(10) Patent No.: US 11,838,120 B2
(45) Date of Patent: Dec. 5, 2023

(54) APPARATUS, METHOD AND COMPUTER PROGRAM FOR USER PLANE FUNCTION CONTROL BY A SET OF CONTROLLERS

(71) Applicant: NOKIA TECHNOLOGIES OY, Espoo (FI)

(72) Inventors: Bruno Landais, Pleumeur-Bodou (FR); Devaki Chandramouli, Plano, TX (US); Laurent Thiebaut, Antony (FR); Georgios Gkellas, Petroupoli Attikis (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/607,935

(22) PCT Filed: May 2, 2019

(86) PCT No.: PCT/EP2019/061307
§ 371 (c)(1),
(2) Date: Nov. 1, 2021

(87) PCT Pub. No.: WO2020/221465
PCT Pub. Date: Nov. 5, 2020

(65) Prior Publication Data
US 2022/0294855 A1    Sep. 15, 2022

(51) Int. Cl.
*H04L 67/141* (2022.01)
*H04L 67/145* (2022.01)
*H04L 69/167* (2022.01)
*H04L 69/24* (2022.01)

(52) U.S. Cl.
CPC .......... *H04L 67/141* (2013.01); *H04L 67/145* (2013.01); *H04L 69/167* (2013.01); *H04L 69/24* (2013.01)

(58) Field of Classification Search
CPC ................ H04L 67/141; H04L 67/145; H04L 69/167; H04L 69/24; H04L 67/04; H04L 67/142

See application file for complete search history.

(56) References Cited

U.S. PATENT DOCUMENTS

| | | | | |
|---|---|---|---|---|
| 10,736,072 B2* | 8/2020 | Youn | ...................... | H04W 60/06 |
| 10,849,057 B2* | 11/2020 | Usui | ...................... | H04W 80/10 |
| 11,558,466 B1* | 1/2023 | Shekhar | .................. | H04L 67/02 |
| 2020/0015131 A1* | 1/2020 | Ying | ...................... | H04W 48/18 |

(Continued)

OTHER PUBLICATIONS

"3rd Generation Partnership Project; Technical Specification Group Core Network and Terminals; 5G System; Restoration Procedures (Release 15)", 3GPP TS 23.527 v15.2.0, (Mar. 2019), 19 pages.

(Continued)

*Primary Examiner* — Ramy M Osman
(74) *Attorney, Agent, or Firm* — ALSTON & BIRD LLP

(57) ABSTRACT

There is provided an apparatus, said apparatus comprising means for providing, from a first function instance of a set of first function instances to a second function, first information comprising an indication that a protocol session between the first function and the second function is controllable by different instances of the set of first function instances and receiving, at one of the set of first function instances from the second function, a protocol session related message based on the first information.

26 Claims, 14 Drawing Sheets

(56) References Cited

U.S. PATENT DOCUMENTS

| | | | | |
|---|---|---|---|---|
| 2020/0084663 | A1* | 3/2020 | Park | H04W 76/27 |
| 2020/0163145 | A1* | 5/2020 | Park | H04W 76/18 |
| 2020/0389935 | A1* | 12/2020 | Jeong | H04W 76/11 |
| 2021/0250192 | A1* | 8/2021 | Alonso Franco | H04L 47/2441 |
| 2021/0288886 | A1* | 9/2021 | Örtenblad | H04L 41/145 |
| 2022/0046729 | A1* | 2/2022 | Jeong | H04L 41/0895 |
| 2022/0174675 | A1* | 6/2022 | Chu | H04L 69/22 |
| 2022/0294855 | A1* | 9/2022 | Landais | H04L 69/167 |
| 2022/0400410 | A1* | 12/2022 | Yang | H04L 47/746 |

OTHER PUBLICATIONS

"3rd Generation Partnership Project; Technical Specification Group Core Network and Terminals; Interface between the Control Plane and the User Plane Nodes; Stage 3 (Release 16)", 3GPP TS 29.244 v16.1.0, (Sep. 2019), 243 pages.

"3rd Generation Partnership Project; Technical Specification Group Services and System Aspects; System Architecture for the 5G System; Stage 2 (Release 16)", 3GPP TS 23.501 v16.1.0, (Jun. 2019), 368 pages.

"Introducing NF Set and NF Service Set in Service Framework", SA WG2 Meeting #133, 23.501 Change Request 1327, S2-1905148, (May 13-17, 2019), 3 pages.

Ericsson et al., "ETSUN Key Issues", SA WG2 Meeting #125, S2-180413, (Jan. 22-26, 2018), 5 pages.

International Search Report and Written Opinion for Patent Cooperation Treaty Application No. PCT/EP2019/061307 dated Jan. 13, 2020, 9 pages.

Jin et al., "Network Aware Peer-To-Peer Media Streaming: Capacity of Proximity?", Computer Networks 69 (Apr. 2014), 18 pages.

NTT DOCOMO et al., "TS 23.501: Resolving EN for SM and SMF/UPF Selection Related To Network Slicing Aspect", SA WG2 Meeting #122bis, S2-176386, (Aug. 21-25, 2017), 5 pages.

Office Action for European Application No. 19723724.1 dated Jul. 10, 2020, 3 pages.

First Examination Report for Indian Application No. 202147054568 dated Apr. 13, 2022, 8 pages.

* cited by examiner

| Octets | Bits | | | | | | | |
|---|---|---|---|---|---|---|---|---|
| | 8 | 7 | 6 | 5 | 4 | 3 | 2 | 1 |
| 1 to 2 | Type = 57 (decimal) | | | | | | | |
| 3 to 4 | Length = n | | | | | | | |
| 5 | Spare | Spare | Spare | Spare | Spare | Spare | V4 | V6 |
| 6 to 13 | SEID | | | | | | | |
| m to (m+3) | IPv4 address | | | | | | | |
| p to (p+15) | IPv6 address | | | | | | | |
| k to (n+4) | These octet(s) is/are present only if explicitly specified | | | | | | | |

Figure 9

| Node ID Type Value (Decimal) | Node ID Type |
|---|---|
| 0 | IPv4 address |
| 1 | IPv6 address |
| 2 | FQDN |
| 3 to 15 | Spare, for future use. |

Figure 13

APPARATUS, METHOD AND COMPUTER PROGRAM FOR USER PLANE FUNCTION CONTROL BY A SET OF CONTROLLERS

CROSS-REFERENCE TO RELATED APPLICATIONS

This application is a national phase entry of International Application No. PCT/EP2019/061307, filed May 2, 2019, the entire contents of which are incorporated herein by reference.

FIELD

The present application relates to a method, apparatus, system and computer program and in particular but not exclusively to user plane function (UPF) control by a session management function (SMF) set.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus comprising means for providing, from a first function instance of a set of first function instances to a second function, first information comprising an indication that a protocol session between the first function and the second function is controllable by different instances of the set of first function instances and receiving, at one of the set of first function instances from the second function, a protocol session related message based on the first information.

The first function may be a session management function. The second function may be a user plane function. The protocol session may be a packet forwarding control protocol session.

The apparatus may comprise means for providing the first information in a protocol association procedure.

The first information may comprise at least one of a fully qualified domain name or identifier associated with the set of first function instances, a flag that the protocol session is controllable by different instances of the set of first function instances and an identifier or internet protocol address of a further first function instance of the set of first function instances.

The further first function instance may be a backup first function instance.

The apparatus may comprise means for any first function instance of the set of first function instances to provide a request to update or release a protocol session association.

The apparatus may comprise means for providing the first information in a protocol session establishment or modification request.

The first information may be included in a control plane fully qualified session identifier.

The first information may comprise at least one of a fully qualified domain name or identifier associated with the set of first function instances, a flag that the protocol session is controllable by different instances of the set of first function instances, a unique session identifier associated with the set of first function instances and an identifier or internet protocol address of a further first function instance of the set of first function instances.

The further first function instance may be a backup first function instance or a preferred first function instance.

When the further first function instance is a preferred first function instance, the identifier of the further first function instance may comprise an IPv4 or IPv6 address.

The first information may comprise a null IPv4 or IPv6 address to indicate that there is no preferred first function instance.

The apparatus may comprise means for any first function instance of the set of first function instances to provide a request to modify or delete a protocol session.

The apparatus may comprise means for any first function instance of the set of first function instances to provide a request rejection to the second function, the request rejection comprising an indication of a first function instance of the set of first function instances.

The apparatus may comprise means for providing the protocol session related message to a first function instance of the set of first function instances.

The apparatus may comprise means for any first function instance of the set of first function instances to setup a single protocol association with the second function.

In a second aspect there is provided an apparatus comprising means for receiving, from a first function instance of a set of first function instances at a second function, first information comprising an indication that a protocol session between the first function and the second function is controllable by different instances of the set of first function instances and providing, from the second function, a protocol session related message to one of the set of first function instances based on the first information.

The first function may be a session management function. The second function may be a user plane function. The protocol session may be a packet forwarding control protocol session.

The apparatus may comprise means for receiving the first information in a protocol association procedure or a protocol session establishment or modification request.

When the first information is received in a protocol session establishment or modification request, the first information may be included in a control plane fully qualified session identifier.

The first information may comprise at least one of a fully qualified domain name or identifier associated with the set of first function instances, a flag that the protocol session is controllable by different instances of the set of first function instances and an identifier or internet protocol address of a backup first function instance of the set of first function instances.

When the first information is received in a protocol session establishment or modification request, the first information may comprise an IPv4 or IPv6 address which indicates a preferred first function instance if non-null and that there is no preferred first function instance if null.

The apparatus may comprise means for providing the protocol session related message from the second function to the IPv4 or IPv6 address if non-null and sending the protocol session related message to any first function instance of the set of first instance if the IPv4 or IPv6 address is null or non-responsive.

The apparatus may comprise means for receiving from any first function instance of the set of first function instances a request to modify or a request to delete a protocol session or a request to update or release a protocol session association.

The apparatus may comprise means for the second function to trigger a restoration procedure if a heartbeat procedure fails with all of the instances of the set of first function instances.

In a third aspect there is provided a method comprising providing, from a first function instance of a set of first function instances to a second function, first information comprising an indication that a protocol session between the first function and the second function is controllable by different instances of the set of first function instances and receiving, at one of the set of first function instances from the second function, a protocol session related message based on the first information.

The first function may be a session management function. The second function may be a user plane function. The protocol session may be a packet forwarding control protocol session.

The method may comprise providing the first information in a protocol association procedure.

The first information may comprise at least one of a fully qualified domain name or identifier associated with the set of first function instances, a flag that the protocol session is controllable by different instances of the set of first function instances and an identifier or internet protocol address of a further first function instance of the set of first function instances.

The further first function instance may be a backup first function instance.

The method may comprise any first function instance of the set of first function instances to providing a request to update or release a protocol session association.

The method may comprise providing the first information in a protocol session establishment or modification request.

The first information may be included in a control plane fully qualified session identifier.

The first information may comprise at least one of a fully qualified domain name or identifier associated with the set of first function instances, a flag that the protocol session is controllable by different instances of the set of first function instances, a unique session identifier associated with the set of first function instances and an identifier or internet protocol address of a further first function instance of the set of first function instances.

The further first function instance may be a backup first function instance or a preferred first function instance.

When the further first function instance is a preferred first function instance, the identifier of the further first function instance may comprise an IPv4 or IPv6 address.

The first information may comprise a null IPv4 or IPv6 address to indicate that there is no preferred first function instance.

The method may comprise any first function instance of the set of first function instances providing a request to modify or delete a protocol session.

The method may comprise any first function instance of the set of first function instances providing a request rejection to the second function, the request rejection comprising an indication of a first function instance of the set of first function instances.

The method may comprise providing the protocol session related message to a first function instance of the set of first function instances.

The method may comprise means for any first function instance of the set of first function instances to setup a single protocol association with the second function.

In a fourth aspect there is provided a method comprising receiving, from a first function instance of a set of first function instances at a second function, first information comprising an indication that a protocol session between the first function and the second function is controllable by different instances of the set of first function instances and providing, from the second function, a protocol session related message to one of the set of first function instances based on the first information.

The first function may be a session management function. The second function may be a user plane function. The protocol session may be a packet forwarding control protocol session.

The method may comprise receiving the first information in a protocol association procedure or a protocol session establishment or modification request.

When the first information is received in a protocol session establishment or modification request, the first information may be included in a control plane fully qualified session identifier.

The first information may comprise at least one of a fully qualified domain name or identifier associated with the set of first function instances, a flag that the protocol session is controllable by different instances of the set of first function instances and an identifier or internet protocol address of a backup first function instance of the set of first function instances.

When the first information is received in a protocol session establishment or modification request, the first information may comprise an IPv4 or IPv6 address which indicates a preferred first function instance if non-null and that there is no preferred first function instance if null.

The method may comprise providing the protocol session related message from the second function to the IPv4 or IPv6 address if non-null and sending the protocol session related message to any first function instance of the set of first instance if the IPv4 or IPv6 address is null or non-responsive.

The method may comprise receiving from any first function instance of the set of first function instances a request to modify or a request to delete a protocol session or a request to update or release a protocol session association.

The method may comprise the second function triggering a restoration procedure if a heartbeat procedure fails with all of the instances of the set of first function instances.

In a fifth aspect there is provided an apparatus comprising: at least one processor and at least one memory including a computer program code, the at least one memory and computer program code configured to, with the at least one processor, cause the apparatus at least to: provide, from a first function instance of a set of first function instances to a second function, first information comprising an indication that a protocol session between the first function and the second function is controllable by different instances of the set of first function instances and receive, at one of the set of first function instances from the second function, a protocol session related message based on the first information.

The first function may be a session management function. The second function may be a user plane function. The protocol session may be a packet forwarding control protocol session.

The apparatus may be configured to provide the first information in a protocol association procedure.

The first information may comprise at least one of a fully qualified domain name or identifier associated with the set of first function instances, a flag that the protocol session is controllable by different instances of the set of first function instances and an identifier or internet protocol address of a further first function instance of the set of first function instances.

The further first function instance may be a backup first function instance.

The apparatus may be configured for any first function instance of the set of first function instances to provide a request to update or release a protocol session association.

The apparatus may be configured to provide the first information in a protocol session establishment or modification request.

The first information may be included in a control plane fully qualified session identifier.

The first information may comprise at least one of a fully qualified domain name or identifier associated with the set of first function instances, a flag that the protocol session is controllable by different instances of the set of first function instances, a unique session identifier associated with the set of first function instances and an identifier or internet protocol address of a further first function instance of the set of first function instances.

The further first function instance may be a backup first function instance or a preferred first function instance.

When the further first function instance is a preferred first function instance, the identifier of the further first function instance may comprise an IPv4 or IPv6 address.

The first information may comprise a null IPv4 or IPv6 address to indicate that there is no preferred first function instance.

The apparatus may be configured for any first function instance of the set of first function instances to provide a request to modify or delete a protocol session.

The apparatus may be configured for any first function instance of the set of first function instances to provide a request rejection to the second function, the request rejection comprising an indication of a first function instance of the set of first function instances.

The apparatus may be configured to provide the protocol session related message to a first function instance of the set of first function instances.

The apparatus may be configured for any first function instance of the set of first function instances to setup a single protocol association with the second function.

In a sixth aspect there is provided an apparatus comprising: at least one processor and at least one memory including a computer program code, the at least one memory and computer program code configured to, with the at least one processor, cause the apparatus at least to: receive, from a first function instance of a set of first function instances at a second function, first information comprising an indication that a protocol session between the first function and the second function is controllable by different instances of the set of first function instances and provide, from the second function, a protocol session related message to one of the set of first function instances based on the first information.

The first function may be a session management function. The second function may be a user plane function. The protocol session may be a packet forwarding control protocol session.

The apparatus may be configured to receive the first information in a protocol association procedure or a protocol session establishment or modification request.

When the first information is received in a protocol session establishment or modification request, the first information may be included in a control plane fully qualified session identifier.

The first information may comprise at least one of a fully qualified domain name or identifier associated with the set of first function instances, a flag that the protocol session is controllable by different instances of the set of first function instances and an identifier or internet protocol address of a backup first function instance of the set of first function instances.

When the first information is received in a protocol session establishment or modification request, the first information may comprise an IPv4 or IPv6 address which indicates a preferred first function instance if non-null and that there is no preferred first function instance if null.

The apparatus may be configured to provide the protocol session related message from the second function to the IPv4 or IPv6 address if non-null and sending the protocol session related message to any first function instance of the set of first instance if the IPv4 or IPv6 address is null or non-responsive.

The apparatus may be configured to receive from any first function instance of the set of first function instances a request to modify or a request to delete a protocol session or a request to update or release a protocol session association.

The apparatus may be configured for the second function to trigger a restoration procedure if a heartbeat procedure fails with all of the instances of the set of first function instances.

In a seventh aspect there is provided a computer readable medium comprising program instructions for causing an apparatus to perform at least the following providing, from a first function instance of a set of first function instances to a second function, first information comprising an indication that a protocol session between the first function and the second function is controllable by different instances of the set of first function instances and receiving, at one of the set of first function instances from the second function, a protocol session related message based on the first information.

The first function may be a session management function. The second function may be a user plane function. The protocol session may be a packet forwarding control protocol session.

The apparatus may be caused to perform providing the first information in a protocol association procedure.

The first information may comprise at least one of a fully qualified domain name or identifier associated with the set of first function instances, a flag that the protocol session is controllable by different instances of the set of first function instances and an identifier or internet protocol address of a further first function instance of the set of first function instances.

The further first function instance may be a backup first function instance.

The apparatus may cause any first function instance of the set of first function instances to provide a request to update or release a protocol session association.

The apparatus may be caused to perform providing the first information in a protocol session establishment or modification request.

The first information may be included in a control plane fully qualified session identifier.

The first information may comprise at least one of a fully qualified domain name or identifier associated with the set of first function instances, a flag that the protocol session is controllable by different instances of the set of first function instances, a unique session identifier associated with the set of first function instances and an identifier or internet protocol address of a further first function instance of the set of first function instances.

The further first function instance may be a backup first function instance or a preferred first function instance.

When the further first function instance is a preferred first function instance, the identifier of the further first function instance may comprise an IPv4 or IPv6 address.

The first information may comprise a null IPv4 or IPv6 address to indicate that there is no preferred first function instance.

The apparatus may cause any first function instance of the set of first function instances to provide a request to modify or delete a protocol session.

The apparatus may cause any first function instance of the set of first function instances to provide a request rejection to the second function, the request rejection comprising an indication of a first function instance of the set of first function instances.

The apparatus may be caused to perform providing the protocol session related message to a first function instance of the set of first function instances.

The apparatus may cause any first function instance of the set of first function instances to setup a single protocol association with the second function.

In an eighth aspect there is provided a computer readable medium comprising program instructions for causing an apparatus to perform at least the following receiving, from a first function instance of a set of first function instances at a second function, first information comprising an indication that a protocol session between the first function and the second function is controllable by different instances of the set of first function instances and providing, from the second function, a protocol session related message to one of the set of first function instances based on the first information.

The first function may be a session management function. The second function may be a user plane function. The protocol session may be a packet forwarding control protocol session.

The apparatus may be caused to perform receiving the first information in a protocol association procedure or a protocol session establishment or modification request.

When the first information is received in a protocol session establishment or modification request, the first information may be included in a control plane fully qualified session identifier.

The first information may comprise at least one of a fully qualified domain name or identifier associated with the set of first function instances, a flag that the protocol session is controllable by different instances of the set of first function instances and an identifier or internet protocol address of a backup first function instance of the set of first function instances.

When the first information is received in a protocol session establishment or modification request, the first information may comprise an IPv4 or IPv6 address which indicates a preferred first function instance if non-null and that there is no preferred first function instance if null.

The apparatus may be caused to perform providing the protocol session related message from the second function to the IPv4 or IPv6 address if non-null and sending the protocol session related message to any first function instance of the set of first instance if the IPv4 or IPv6 address is null or non-responsive.

The apparatus may be cussed to perform receiving from any first function instance of the set of first function instances a request to modify or a request to delete a protocol session or a request to update or release a protocol session association.

The apparatus may cause the second function to trigger a restoration procedure if a heartbeat procedure fails with all of the instances of the set of first function instances.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 9 shows an example information element;

FIG. 13 shows a Node ID Type table;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
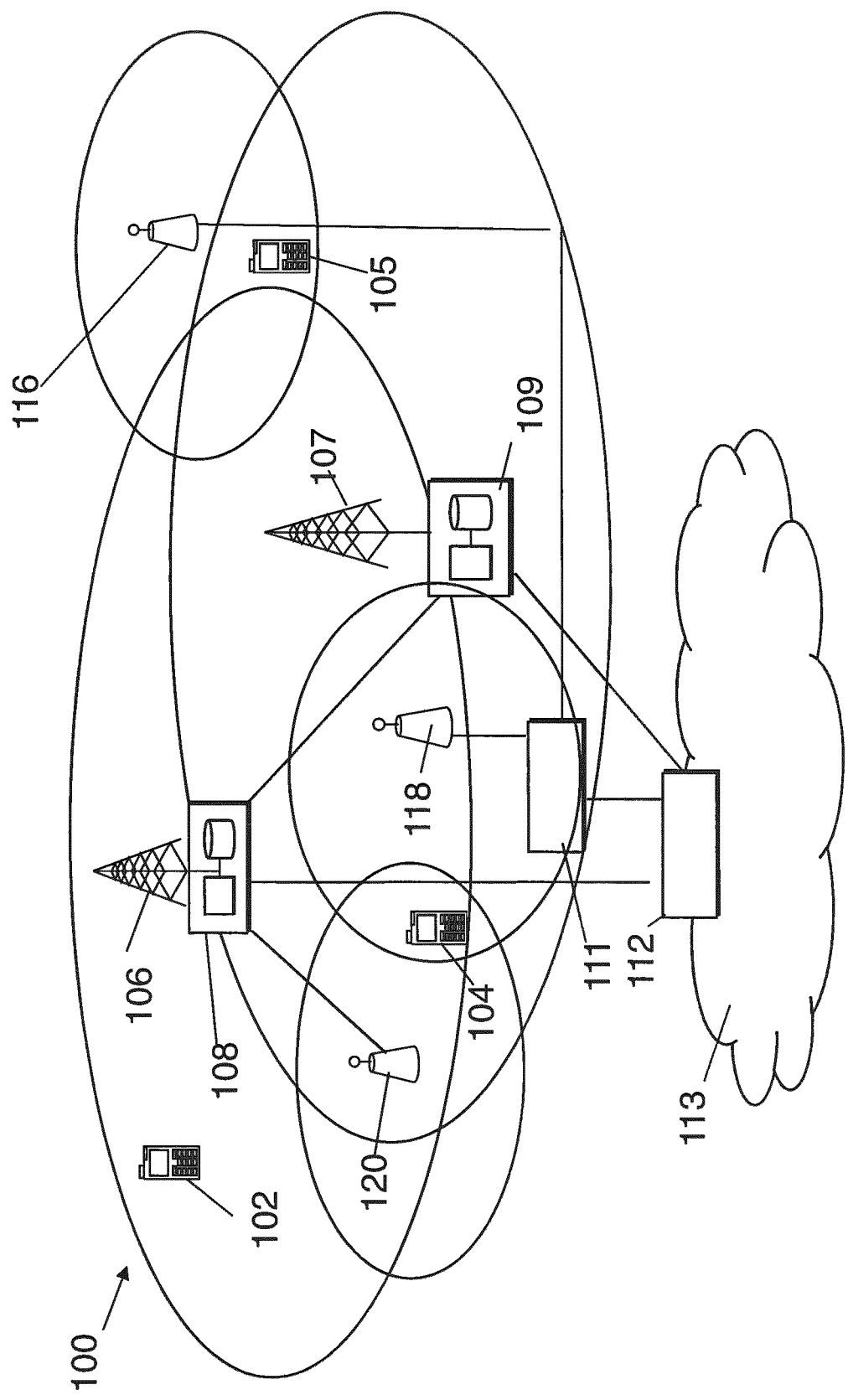
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. New functions are defined in the 5G system architecture, including an Access Management Function (AMF), Session Management Function (SMF), User Plane Function (UPF), among other network functions in the 5G Core (5GC). The 5G System supports new capabilities, including network slicing which may better tailor networks to application requirements and provide virtual networks for tenants. It also uses a services-based architecture that provides greater flexibility for introducing new services and features compared to the EPC which relied on fixed, peer-peer reference points. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. NR may also support lower latency for air-interface transmission due to revisions in physical and MAC layer protocols.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, by a Centralized Unit (CU) at least partly, in a server, host or node operationally coupled to Distributed Unit (DU), which may connect to a remote radio head (RRH). It is also possible that node operations will be distributed among a plurality of servers, nodes or hosts. It should also be understood that the distribution of labour between core network operations and base station operations may differ from that of the LTE or even be non-existent.

Figure 2:
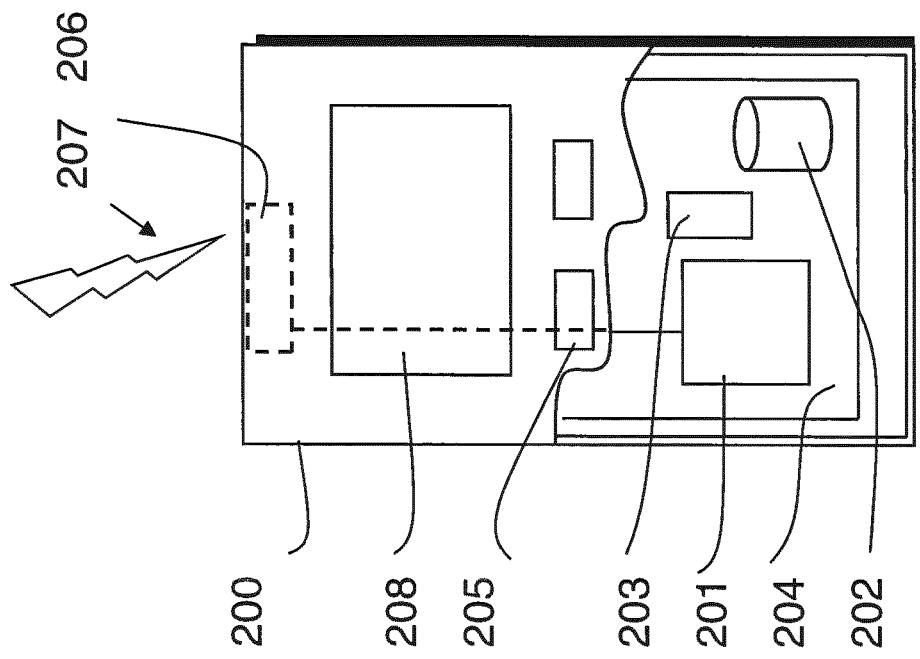
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
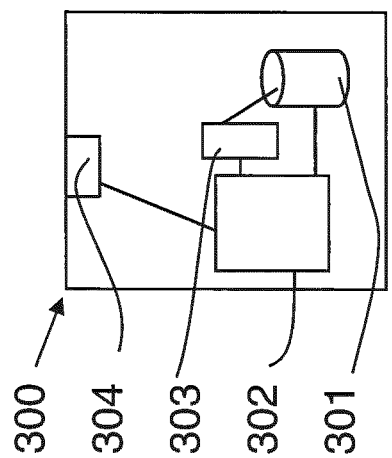
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as an AMF or SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus, such as a CU Control Plane (CU-CP) as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Figure 4:
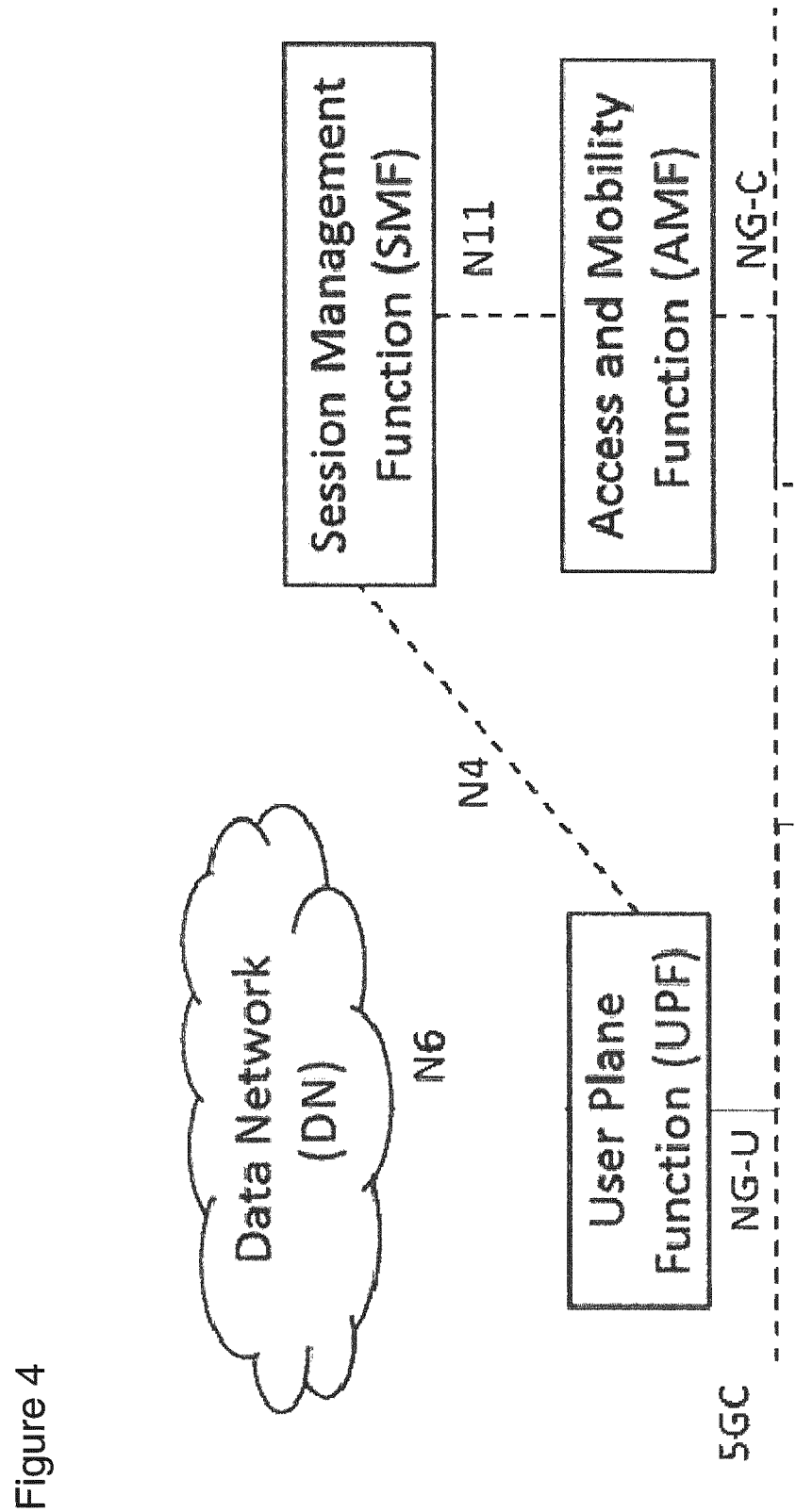
FIG. 4 shows a schematic diagram of an example 5G core network.

FIG. 4 shows a schematic diagram of an example 5G core network (CN). An example 5G core network (CN) comprises functional entities. The CN is connected to a UE via the radio access network (RAN). An UPF(User Plane Function) which may be an Intermediate UPF or a PSA (PDU Session Anchor) providing an anchor point for user IP, Ethernet or Unstructured user data sessions. The UPF may be responsible for forwarding PDU(s) (e.g. IP packets or Ethernet frames) back and forth between

- the DN (data network) and the 5G Access Network (e.g. gNB in case of 3GPP access or a N3IW/TNGF/W-AGF in case of Non 3GPP Access)
- the DN (data network) and another UPF supporting the PDU Session
- the 5G Access Network (e.g. gNB in case of 3GPP access or a N3IWF/TNGF/W-AGF in case of Non 3GPP Access).

The UPF is controlled by an SMF (Session Management Function) that may receive policies from a PCF(Policy Control Function). The CN may also include an AMF (Access & Mobility Function) which terminates the control plane interface with the 5G Access Network and manages UE registrations and mobility.

3GPP Rel-16 (enhancement to Service Based Architecture Work Item) supports the concept of SMF Set that comprises functionally equivalent SMF instances that can all have access to the Session Management (SM) contexts handled by the SMF Set and that call all serve SM requests targeting the SMF Set. 3GPP Rel-16 generalizes the concept of NF Set in the 5GC Control Plane (limited to AMF Set in Rel-15) for enhanced scalability (e.g. upon scale-in or scale-out operations), dynamic load rebalancing, resiliency and to enable the support of stateless NFs. See 3GPP TS 23.501.

Per existing system architecture, an SMF controls the user plane functionalities in the UPF over the N4 interface using the packet forwarding control protocol (PFCP) (see 3GPP TS 29.244). The N4 interface is currently defined as a point to point interface between one SMF instance and one UPF; the PFCP sessions established in the UPF (e.g. to support PDU sessions) are tied to the SMF instance that created them.

Before establishing any PFCP session (e.g., during a PDU session establishment), the SMF shall set up one PFCP association with the UPF. The PFCP association establishment procedure is a node related procedure during which the UPF signals its node capabilities (e.g. the features it supports) and configuration (e.g. IP addressing information) to the SMF.

When establishing then a PFCP session, the SMF signals to the UPF in the PFCP session establishment request message one "CP Node ID" (Control Plane Node ID), that can take the form of either an IP address or a fully qualified domain name (FQDN), identifying the SMF instance, and one CP F-SEID (Control Plane Fully Qualified Session identifier) identifying the PFCP session in the CP node, i.e. an IP address+a Session Identifier (SEID).

The UPF sends subsequent session related request messages to the SMF for that PFCP session (e.g. to send a Session Report message when a DL packet arrives for a PDU session without an active user plane connection), to the IP address received in the CP F-SEID assigned by SMF. This may be problematic in deployments with SMF Set.

It may be useful to adapt the N4 protocol (PFCP) to enable any SMF instance from an SMF Set to control any PFCP session created by any other SMF instance of the SMF Set, and/or the UPF to initiate signalling towards any SMF instance of the SMF Set.

For example, the SMF instance that created the PFCP session may no longer be available due to SMF instance failure, SMF instance planned maintenance or scale-in operations, or new SMF instances may have been deployed in the SMF Set (scale-out operation).

3GPP CT4 has not discussed yet the implications of the SMF Set concept for the N4/PFCP protocol.

Using the current PFCP protocol, a SMF Set could setup one single PFCP Association with a UPF, with the CP Node ID taking the form of a fully qualified domain name (FQDN), assuming the SMFs within the SMF set coordinate themselves about the setup/update/release of the PFCP association (vendor specific implementation). The protocol allows an SMF to change the F-SEID assigned to an existing PFCP session, so when an SMF instance takes over the PFCP sessions created by a different SMF instance (e.g. upon failure or removal of the latter SMF instance), this SMF instance could change the F-SEID assigned to the relevant PFCP sessions with an own IP address.

This may result though in increased signalling to update the F-SEID of hundreds of thousands of PFCP sessions, and/or cause UPF failures to initiate session related signalling to the SMF until the PFCP session is updated with the new F-SEID. The UPF may release the PFCP sessions if it detects a communication or heartbeat failure with the IP address of the F-SEID.

A possible alternative solution may be to move the IP addresses assigned in CP F-SEID across the SMF instances of the SMF Set, to hide to the UPF the addition/removal of SMF instances within the SMF Set. Such a solution may cause implementation complexity and operational constraints, e.g., because the SMF instances may be deployed in different locations/subnetworks.

Figure 5:
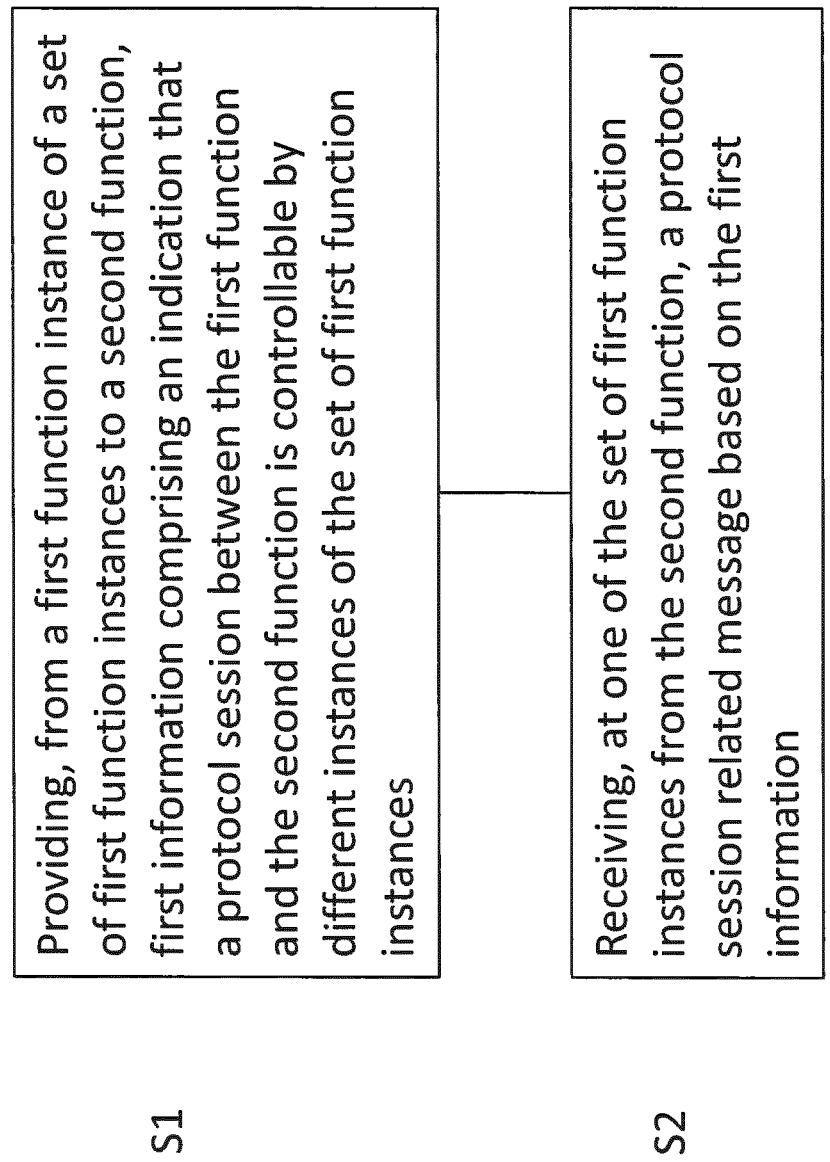
FIG. 5 shows a flowchart of a method according to an example embodiment.

FIG. 5 shows a flowchart of a method according to an example embodiment. The method shown in FIG. 5 may be performed at least one SMF of an SMF set.

In a first step, S1, the method comprises providing, from a first function instance of a set of first function instances to a second function, first information comprising an indication that a protocol session between the first function and the second function is controllable by different instances of the set of first function instances.

In a second step, S2, the method comprises receiving, at one of the set of first function instances from the second function, a protocol session related message based on the first information.

Figure 6:
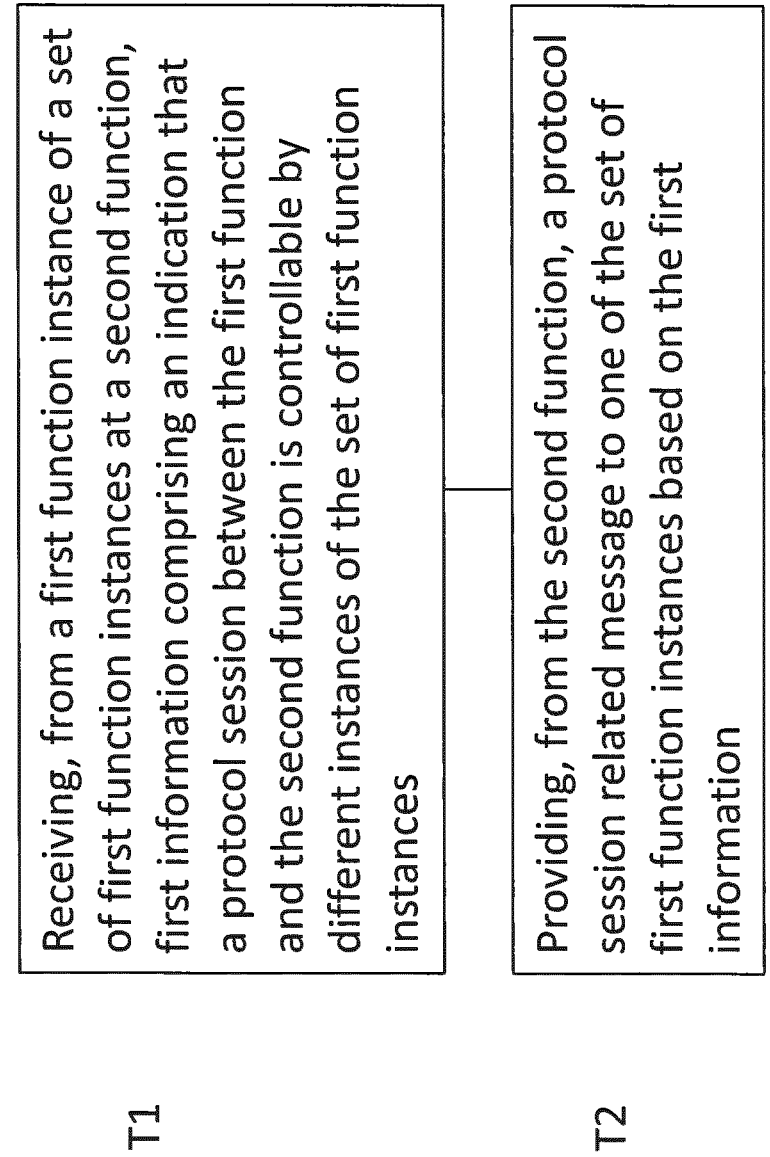
FIG. 6 shows a flowchart of a method according to an example embodiment.

FIG. 6 shows a flowchart of a method according to an example embodiment. The method shown in FIG. 6 may be performed at a UPF.

In a first step, T1, the method comprises receiving, from a first function instance of a set of first function instances at a second function, first information comprising an indication that a protocol session between the first function and the second function controllable by different instances of the set of first function instances.

In a second step, T2, the method comprises providing, from the second function, a protocol session related message to one of the set of first function instances based on the first information The first function may be a session management function (SMF). The second function may be a user plane function (UPF). The protocol session may be a PFCP session.

The first information may comprise at least one of a flag that the protocol session is controllable by different instances of the set of first function instances, a fully qualified domain name or an identifier of the set of first functions and an identifier or IP address of a further first function instance of the set of first function instances. The set of first function instances may be identified by an SMF identifier or FQDN.

The further first function instance may be a backup first function instance.

The first information may be provided in a protocol association establishment procedure or a protocol session establishment or modification request.

The method may comprise any first function instance of the set of first function instances setting a single protocol association with the second function If the first information is provided in a protocol session establishment or modification request, it may be included in a CP F-SEID (Control Plane Fully qualified Session Identifier). The further first function instance may be a preferred first function instance if a binding with a first function instance is preferred. In this case, the identifier of the further first function instance may comprise an internet protocol address, e.g., an IPv4 or IPv6 address. or a preferred first function instance.

The method may comprise providing the protocol session related message from the second function to the IPv4 or IPv6 address if non-null and sending the protocol session related message to any first function instance of the set of first instance if the IPv4 or IPv6 address is null or non-responsive.

Alternatively, the second function may provide a session related request message towards the backup first function instance, if an IP address or an identifier for a backup instance was provided and the IP address signalled in the existing IPv4 or IPv6 address fields is not responsive.

If the first information is provided in a protocol session establishment or modification request, it may comprise a unique session identifier (SEID).

The protocol session between the first function and the second function being controllable by different function instances of the first set of function instances may be defined as a PFCP session not being tied to a unique PFCP entity (i.e. a unique IP address of an SMF instance). Instead, the protocol session may be tied to any PFCP entity within a set of first functions (e.g., within a set of SMF(s) where the SMF set may be identified by a SMF Set Identifier or a FQDN).

A protocol related session message initiated by the UPF may be a PFCP Session Report Request.

That is, an SMF of an SMF set may signal to a UPF, during the PFCP Association Setup procedure or during the PFCP Session Establishment procedure, at least one of the SMF Set Identifier or FQDN, a Backup SMF Instance ID(s) or IP address, and that the PFCP sessions are not tied to a unique PFCP entity (i.e. a unique IP address of an SMF instance).

One single PFCP Association may be established between an SMF Set and a UPF. In this case, the management of the PFCP Associations across an SMF set (i.e. between SMFs within the SMF set) is implementation specific but the standards requirement may be that the PFCP Association with a UPF is managed and is unique at SMF set level. Node related procedures (e.g. PFCP association establishment, load/overload control) may be coordinated between the SMFs within the SMF set. It is not assumed that there is a front-end function coordinating the SMF set to avoid single point of failure architectures. The PFCP Association Setup is also used to enable the SMF to learn whether the UPF supports being controlled by a SMF set (and not by an individual SMF).

During the PFCP session establishment, the SMF may additionally signal a preferred binding to one specific SMF instance by optionally including in the CP F-SEID a non-null IPv4 or IPv6 address; the SMF may also signal in addition the SMF Set Identifier or FQDN or the Backup SMF Instance ID or IP address.

Signalling a preferred binding may avoid e.g., the UPF reselecting a different SMF instance for every new initiated session related request message towards the SMF Set for a given PFCP session.

The UPF may initiate session related requests messages towards the IPv4 or IPv6 address of a specific SMF instance, if a preferred binding exists, i.e. if the existing IPv4 or IPv6 address fields is signalled with a non-null IP address.

The UPF may initiate session related requests messages towards any SMF instance of the SMF Set, if no preferred binding exists towards a specific SMF instance, or if one exists but the corresponding IP address is not responsive.

The UPF may initiate session related requests messages towards the Backup SMF instance, if a Backup SMF IP address or a Backup SMF instance ID was signalled by the SMF and the IP address signalled in the existing IPv4 or IPv6 address fields is not responsive.

The UPF may use the SMF Set Identifier or FQDN to discover the SMF instances within the SMF Set, e.g. by querying the DNS or by performing a discovery request towards the NRF. For the latter, each SMF instance may register in its NF profile in the NRF the SMF Set Identifier or FQDN. The UPF also uses the Backup SMF Instance ID to discover an IP address of that SMF by querying the DNS or initiating a discovery request towards the NRF.

Any first function instance of the set of first function instances may issue a request to a second function to modify or a request to delete a protocol session or a request to update or release a protocol session association. That is, any SMF in the SMF set may issue requests to a UPF modify or delete the PFCP session, or to update or release the PFCP association.

The second function may trigger a restoration procedure if a heartbeat procedure fails with all of the instances of the set of first function instances. For PFCP sessions that are not tied to a unique CP PFCP entity, the UPF may not trigger error handling i.e. the restoration procedures specified in TS 23.527 (e.g. release locally the PFCP session) if a heartbeat failure is detected with the IP address of the preferred binding. Restoration procedures may be triggered only if heartbeat fails with all the IP addresses of all the SMF instances in the SMF Set.

Figure 7:
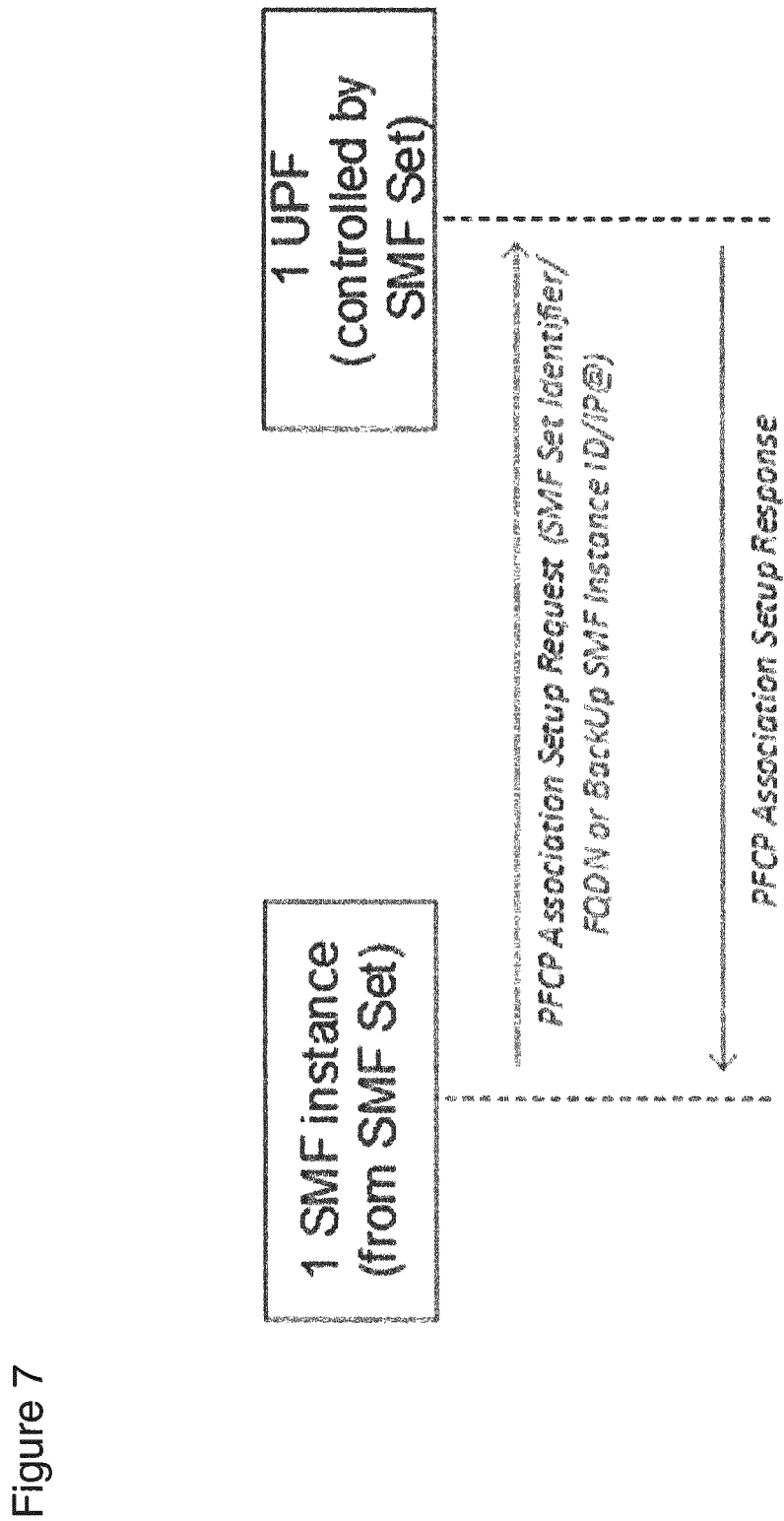
FIG. 7 shows a signalling flow between a SMF instance and a UPF according to an example embodiment.

FIG. 7 shows an example signalling diagram for a PFCP Association Setup procedure between a SMF instance of a SMF set and a UPF controlled by the SMF set.

In the example shown in FIG. 7, prior to establishing a first PFCP session in the UPF, one SMF instance in the SMF Set establishes one PFCP association with the UPF. Node related procedures (e.g. PFCP association establishment, load/overload control) are coordinated between the SMF instances in the SMF Set (implementation specific, e.g. relying on UPF status information stored in UDSF).

The SMF may signal to the UPF during the PFCP association procedure a new SMF Set Identifier, FQDN or a new backup SMF Instance ID or IP address.

In one example embodiment, one SMF in the SMF set shall establish one single PFCP Association with the UPF for the SMF set; the Node ID in the PFCP Association Setup Request shall be set to an FQDN representing the SMF set.

Table 1 shows Information Elements in a PFCP Association Setup Request including an SMF Set Identifier or FQDN and Backup SMF in the bottom two rows.

| Information elements | P | Condition/Comment | IE Type |
|---|---|---|---|
| Node ID | M | This IE shall contain the unique identifier of the sending Node. | Node ID |
| Recovery Time Stamp | M | This IE shall contain the time stamp when the node was started, see clause 19A of 3GPP TS 23.007 [24]. | Recovery Time Stamp |
| UP Function Features | C | This IE shall be present if the UP function sends this message and the | UP Function Features |

| Information elements | P | Condition/Comment | IE Type |
|---|---|---|---|
| | | UP function supports at least one UP feature defined in this IE. When present, this IE shall indicate the features the UP function supports. | |
| CP Function Features | C | This IE shall be present if the CP function sends this message and the CP function supports at least one CP feature defined in this IE. When present, this IE shall indicate the features the CP function supports. | CP Function Features |
| User Plane IP Resource Information | O | This IE may be present if the UP function sends this message. When present, this IE shall contain an IPv4 and/or an IPv6 address, together with a TEID range that the CP function shall use to allocate GTP-U F-TEID in the UP function. Several IEs with the same IE type may be present to represent multiple User Plane IP Resources. | User Plane IP Resource Information |
| SMF Set Identifier or FQDN | O | This IE may be present if the PFCP association is controlled by a SMF Set | SMF Set Identifier or FQDN |
| Backup SMF | O | This IE may be present if a backup SMF instance can take over the control of the PFCP association and its PFCP sessions. | BackUp SMF Instance ID or IP address |

The addition of the SMF Set Identifier or FQDN and Backup SMF corresponds to one possible implementation. These parameters may not be needed with the alternative implementation described with reference to FIG. 8.

Figure 8:
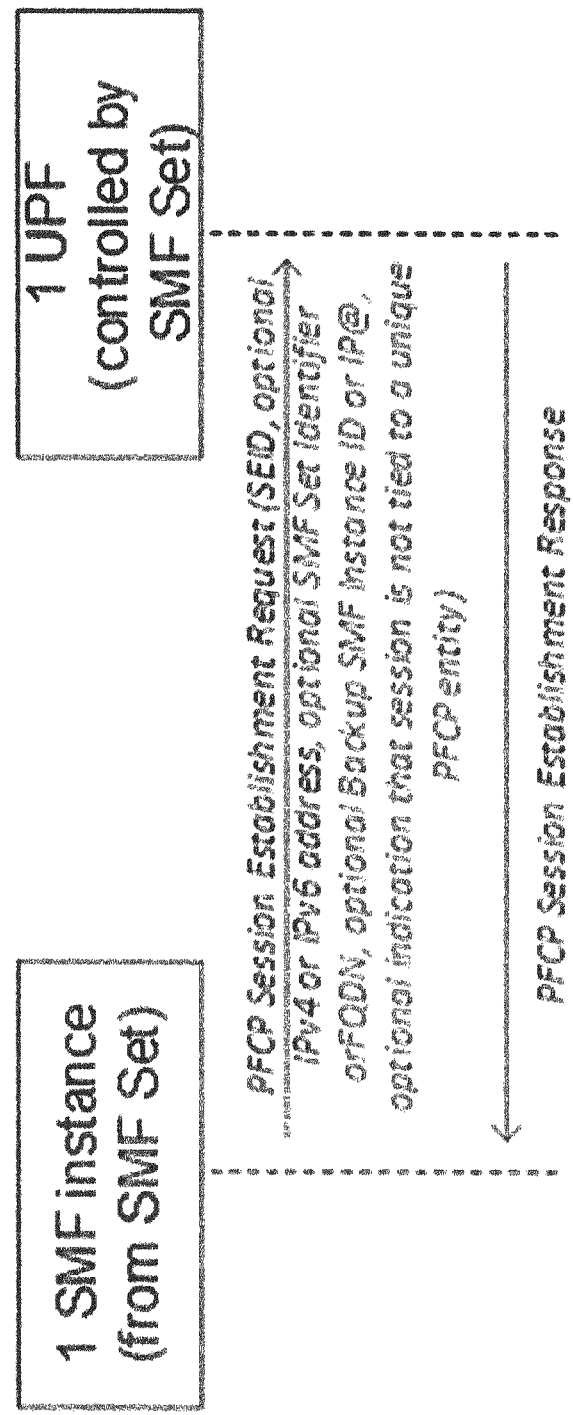
FIG. 8 shows a signalling flow between a SMF instance and a UPF according to an example embodiment.

FIG. 8 shows an example signalling diagram for a PFCP Session Establishment procedure between a SMF instance of a SMF set and a UPF controlled by the SMF set.

In this example embodiment, the SMF provides to the UPF a Control Plane (CP) SEID (Session Identifier), and at least one of IPv4 or IPv6 address if a binding is preferred with a specific SMF instance, a SMF Set Identifier or FQDN (if not provided during PFCP association establishment), a backup SMF Instance Identifier or IP address (if not provided during PFCP association establishment) and an indication that the PFCP session is not tied to a unique PFCP entity (i.e. the PFCP session is not tied only to the IP address provided in the CP-F-SEID, if an IPv4 or an IPv6 address is provided). The SMF(s) within a SMF set ensure unique allocation of SEID within the set.

If none of the existing IPv4 and IPv6 addresses are assigned, an IPv4 (or an IPv6) null address may be signalled since PFCP requires at least one of IPv4 or IPv6 address to be included.

In one example embodiment, when establishing a PFCP session, an SMF assigns, in the CP F-SEID of the PFCP Session Establishment Request, a unique SEID within the SMF set, indicates to the UPF that the PFCP session can be successively controlled by different SMFs of an SMF set, by including the SSET flag in the CP F-SEID and may additionally signal a preferred binding to one specific SMF by including an IPv4 or IPv6 address of that SMF in the CP F-SEID. If no preferred binding to one specific SMF is desired, the CP F-SEID shall contain a null IPv4 or IPv6 address.

Table 2 shows the Information Elements in a PFCP Session Establishment Request.

TABLE 2

| Information elements | P | Condition/Comment | Appl. | | | | IE Type |
|---|---|---|---|---|---|---|---|
| | | | Sxa | Sxb | Sxc | N4 | |
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session. Several IEs with the same IE type may be present to represent multiple PDRs. See Table 7.5.2.2-1. | X | X | X | X | Create PDR |
| Create FAR | M | This IE shall be present for at least one FAR to be associated to the PFCP session. Several IEs with the same IE type may be present to represent multiple FARs. See Table 7.5.2.3-1. | X | X | X | X | Create FAR |
| Create URR | C | This IE shall be present if a measurement action shall be applied to packets matching one or more PDR(s) of this PFCP session. Several IEs within the same IE type may be present to represent multiple URRs. See Table 7.5.2.4-1. | X | X | X | X | Create URR |

TABLE 2-continued

| Information elements | P | Condition/Comment | Sxa | Sxb | Sxc | N4 | Appl. IE Type |
|---|---|---|---|---|---|---|---|
| Create QER | C | This IE shall be present if a QoS enforcement or QoS marking action shall be applied to packets matching one or more PDR(s) of this PFCP session. Several IEs within the same IE type may be present to represent multiple QERs. See Table 7.5.2.5-1. | — | X | X | X | Create QER |
| Create BAR | O | When present, this IE shall contain the buffering instructions to be applied by the UP function to any FAR of this PFCP session set with the Apply Action requesting the packets to be buffered and with a BAR ID IE referring to this BAR. See table 7.5.2.6-1. | X | — | — | X | Create BAR |
| Create Traffic Endpoint | C | This IE may be present if the UP function has indicated support of PDI optimization. Several IEs within the same IE type may be present to represent multiple Traffic Endpoints. See Table 7.5.2.7-1. | X | X | X | X | Create Traffic Endpoint |
| PDN Type | C | This IE shall be present if the PFCP session is setup for an individual PDN connection or PDU session (see subclause 5.2.1). When present, this IE shall indicate whether this is an IP or non-IP PDN connection/PDU session or, for 5GC, an Ethernet PDU session. | X | X | — | X | PDN Type |
| SGW-C FQ-CSID | C | This IE shall be included according to the requirements in clause 23 of 3GPP TS 23.007 [24]. | X | X | — | | FQ-CSID |
| MME FQ-CSID | C | This IE shall be included when received on the S11 interface or on S5/S8 interface according to the requirements in clause 23 of 3GPP TS 23.007 [24]. | X | X | — | — | FQ-CSID |
| PGW-C FQ-CSID | C | This IE shall be included according to the requirements in clause 23 of 3GPP TS 23.007 [24]. | X | X | — | — | FQ-CSID |
| ePDG FQ-CSID | C | This IE shall be included according to the requirements in clause 23 of 3GPP TS 23.007 [24]. | — | X | — | — | FQ-CSID |
| TWAN FQ-CSID | C | This IE shall be included according to the requirements in clause 23 of 3GPP TS 23.007 [24]. | — | X | — | — | FQ-CSID |
| User Plane Inactivity Timer | O | This IE may be present to request the UP function to send a User Plane Inactivity Report when no user plane packets are received for this PFCP session for a duration exceeding the User Plane Inactivity Timer. When present, it shall contain the duration of the inactivity period after which a User Plane Inactivity Report shall be generated. | — | X | X | X | User Plane Inactivity Timer |
| User ID | O | This IE may be present, based on operator policy. It shall only be sent if the UP function is in a trusted environment. See NOTE. | X | X | X | X | User ID |
| Trace Information | O | When present, this IE shall contain the trace instructions to be applied by the UP function for this PFCP session. | X | X | X | X | Trace Information |

NOTE:
This can be used for troubleshooting problems in the UP function affecting a subscriber.

FIG. 9 shows an example coded F-SEID. The following flags are coded within Octet 5
Bit 1—V6: If this bit is set to "1", then IPv6 address field shall be present in the F-SEID, otherwise the IPv6 address field is not present at all.
Bit 2—V4: If this bit is set to "1", then IPv4 address field shall be present in the F-SEID, otherwise the IPv4 address field is not present at all.
Bit 3 to 8 are spare and reserved for future use.
At least one of V4 and V6 shall be set to "1", and both may be set to "1". Octets "m to (m+3)" and/or "p to (p+15)" (IPv4 address/IPv6 address fields), if present, contain respective address values.

Figure 10:
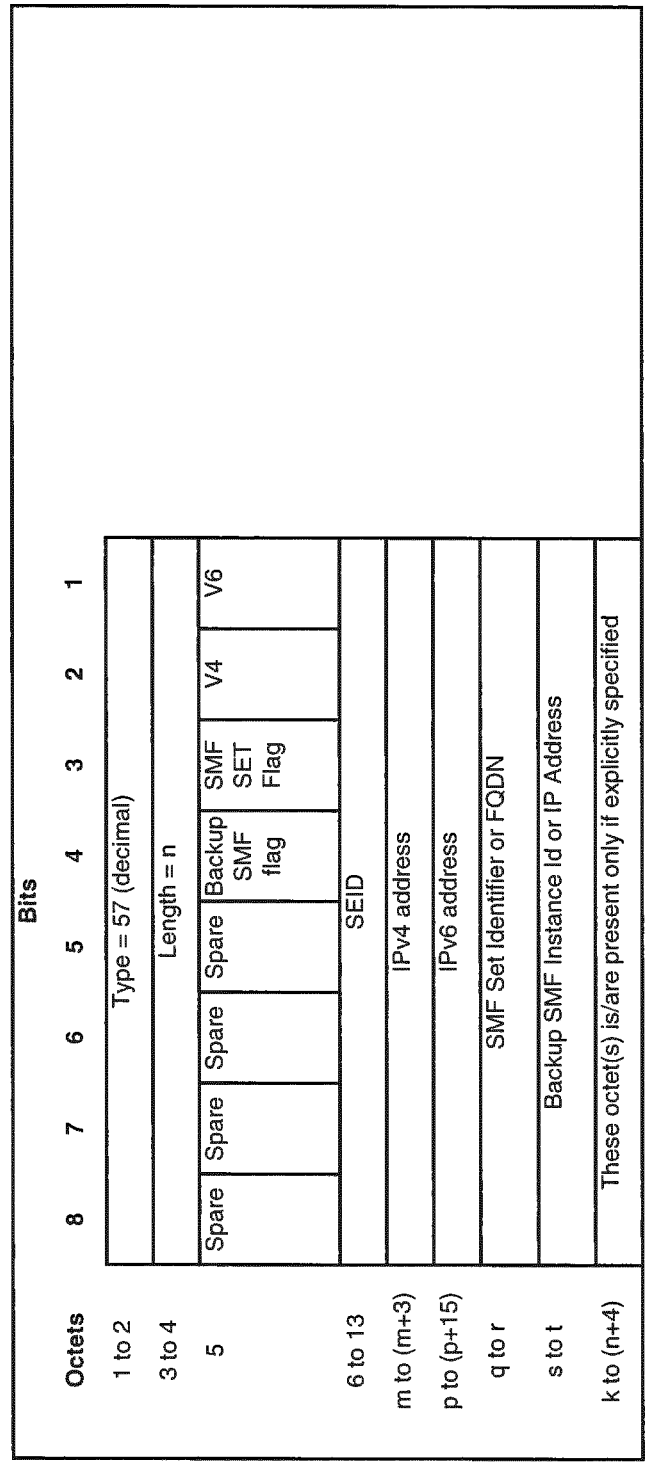
FIG. 10 shows an information element according to an example embodiment.

Since the F-SEID IE is an extendable IE (see subclause 8.1.2 of 3GPP TS 29.244), in one possible implementation, it may be extended e.g. as shown in FIG. 10. In FIG. 10 the fields SMF Set Identifier or FQDN; Backup SMF Instance Id or IP Address are present if the corresponding flag is set to 1.

Figure 11:
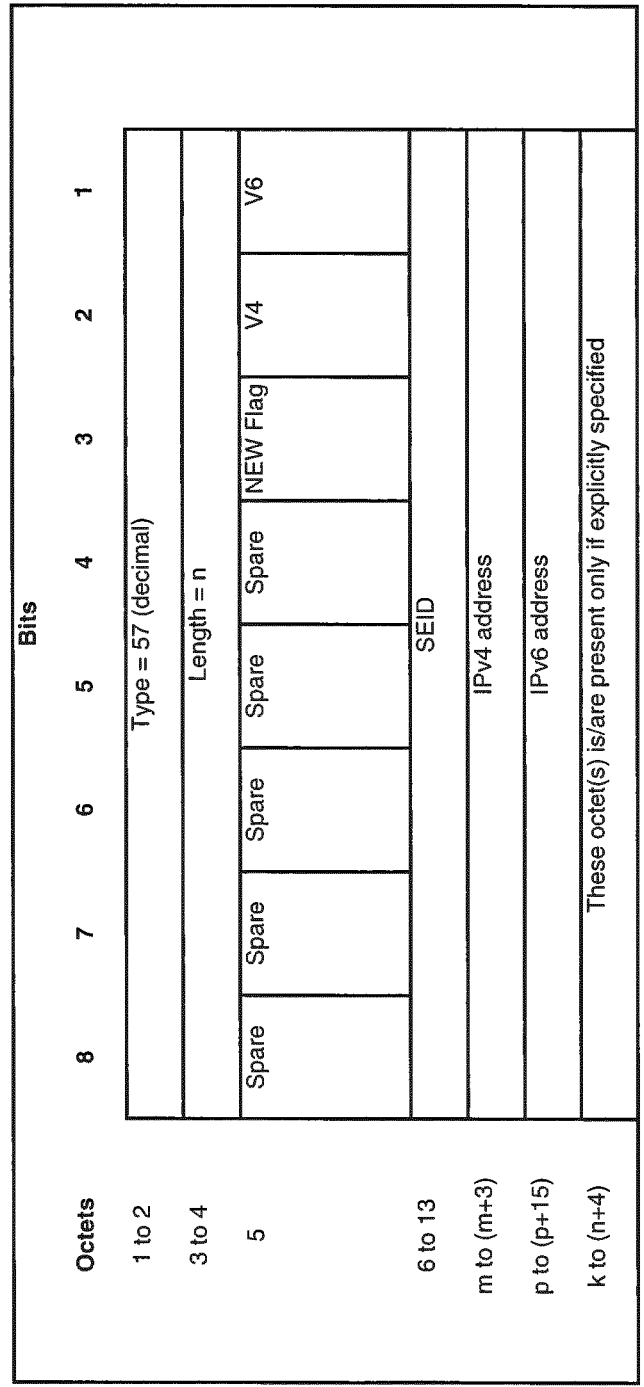
FIG. 11 shows an information element according to an example embodiment.
Figure 12:
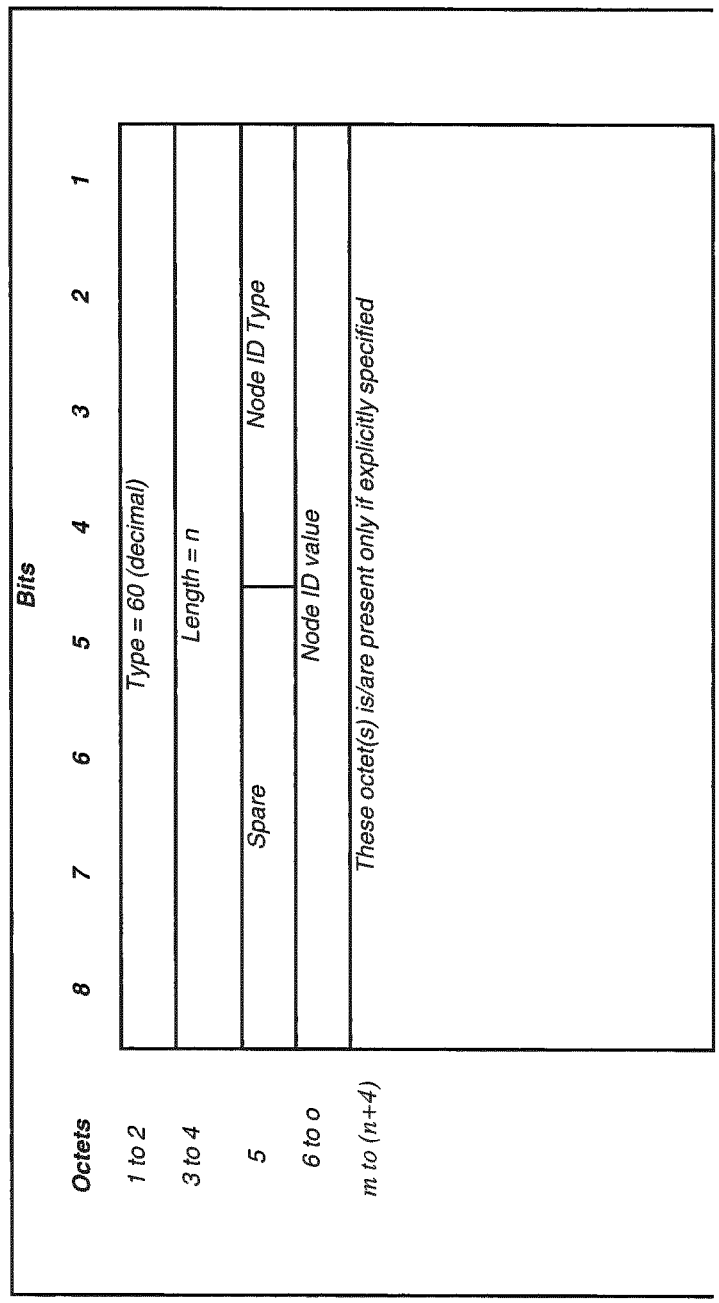
FIG. 12 shows an example information element.

In an alternative embodiment, shown in FIG. 11, a flag is included in the F-SEID, indicating to the UPF that the PFCP session is not tied to a unique CP PFCP entity (i.e. IP address). This flag indicates, when it is set, that the UPF shall consider that any IP address it can derive (by DNS query or NRF discovery procedure) from the CP Node ID IE can take over the control of the PFCP session. In this case the UPF should use the IP address that has been provided in the F-SEID (if any) when establishing the PFCP session or upon a subsequent PFCP session modification, but may use another one if there is an issue.

The NODE ID is defined in 3GPP TS 29.244. In this alternative implementation, it may be specified that the NODE ID is encoded as an FQDN representing the SMF Set.

The Node ID IE shall contain an FQDN or an IPv4/IPv6 address. It shall be encoded as shown in FIG. 13.

Node ID Type indicates the type of the Node ID value. The Node ID value be encoded as a 4 bits binary integer as specified in Table 13. If the Node ID is an IPv4 address, the Node ID value length shall be 4 Octet. If the Node ID is an IPv6 address, the Node ID value length shall be 16 Octet. If the Node ID is an FQDN, the Node ID value encoding shall be identical to the encoding of a FQDN within a DNS message of section 3.1 of IETF RFC 1035 [27] but excluding the trailing zero byte.

Figure 14:
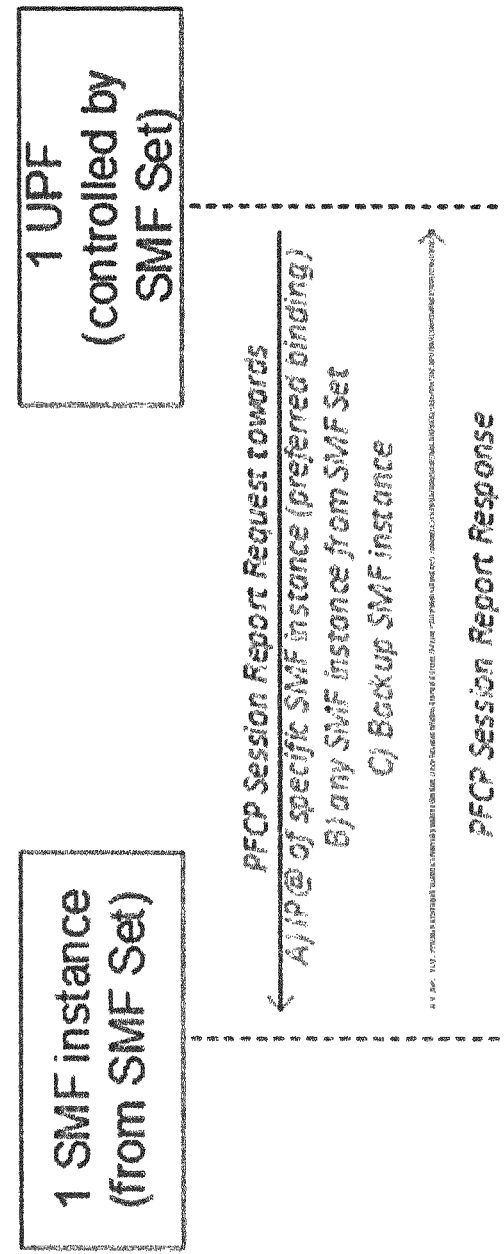
FIG. 14 shows a signalling flow between a SMF instance and a UPF according to an example embodiment.

FIG. 14 shows an example signalling diagram for a PFCP Session Report Request and Response between a SMF instance of a SMF set and a UPF controlled by the SMF set.

The UPF initiates session related request messages (e.g. PFCP Session Report Request, see subclauses 6.3.5 and 7.5.8 of TS 29.244) towards either the IPv4 or IPv6 address of a specific SMF instance (preferred binding exists) if the existing IPv4 or IPv6 address fields is signalled with a non-null IP address or any SMF instance of the SMF Set, if no preferred binding exists towards a specific SMF instance, or if one exists but the corresponding IP@ is not responsive.

The UPF uses the SMF Set Identifier or FQDN (or the FQDN in the CP NODE IE in the alternative implementation of step 2) to discover the SMF instances within the SMF Set, e.g. by querying the DNS or by performing a discovery request towards the NRF. For the latter, each SMF instance registers in its NF profile in the NRF the SMF Set Identifier or FQDN.

Alternatively, the UPF may initiate a session related request message towards the Backup SMF instance, if a Backup SMF IP address or a Backup SMF instance ID was signalled by the SMF and the IP address signalled in the existing IPv 4 or IPv 6 address fields is not responsive. This alternative may be mutually exclusive with that of the preceding paragraph, i.e. the SMF indicates either a SMF Set or a backup SMF for a PFCP Session. This allows UPF implementations to support different SMF resiliency schemes (1 to 1 in case a Backup SMF instance is used or one to many in case an SMF Set is used)).

A PFCP session corresponds to one PDU Session. It may happen that when a first SMF instance that used to serve a PDU Session (and thus the corresponding PFCP Session) has failed or has decided to no more serve a PDU Session, 5G Control Plane procedures select a second SMF instance to serve this PDU Session (and thus the corresponding PFCP Session) but that later on the UPF (as it is not aware change of SMF instance to serve the PFCP Session) selects a third SMF instance.

The method may comprise providing a request rejection to the second function, the request rejection comprising an indication of a first function instance of the set of first function instances. An SMF may redirect a UPF initiated PFCP session related request to a different SMF in the SMF set by rejecting the request with the cause "Redirection Requested" and with the CP F-SEID IE including the IP address of the new SMF to contact (i.e. new preferred SMF binding).

For example, an SMF instance that determines it is not the proper SMF to serve a PFCP Session about which it receives a message from the UPF may redirect a UPF initiated PFCP session related request to a different SMF in the SMF set by rejecting the request with the cause "Redirection Requested" and with the CP F-SEID IE including the IP address of the new SMF to contact (i.e. new preferred SMF binding). Alternatively, an SMF may forward the UPF request to another SMF in the SMF set; the new SMF answers to the UPF, optionally including the CP F-SEID IE with the IPv 4 or IPv 6 address of the new preferred SMF.

Alternatively, an SMF may forward the UPF request to another SMF in the SMF set; the new SMF answers to the UPF, optionally including the CP F-SEID IE with the IPv4 or IPv6 address of the new preferred SMF. That is, the method may comprise providing the protocol session related message to a first function instance of the set of first function instances.

For example, to avoid requiring coordination between SMF instances for unique SEID allocation, when the UPF re-selects an alternative SMF instance in the set, it sets a null SEID in the header of the PFCP session related request message it sends to the new SMF instance and it includes the old F-SEID in the message. The new SMF instance retrieves the session context using the old F-SEID and assigns a new F-SEID in the response.

The above method may also be applied to a distributed SMF implementation (regardless of the concept of SMF Set introduced in Rel-16), when other PFCP entities (i.e. IP addresses) of the SMF can take over the control of the PFCP session when the PFCP entity that created the PFCP session fails or is removed from the SMF. The above method may also be applied to a SMF service set, e.g. to allow the reselection by the UPF of an SMF service instance from a specific SMF service set for network slicing scenarios.

The method may allow any SMF instance within an SMF set to control the UPF associations and the PFCP sessions established in a UPF, without any extra N4 signalling and without any failure or loss of messages or PFCP session contexts in the UPF The method may be implemented in a control apparatus as described with reference to FIG. 3.

An apparatus may comprise means for providing, from a first function instance of a set of first function instances to a second function, first information comprising an indication that a protocol session between the first function and the second function is controllable by different instances of the set of first function instances and receiving, at one of the set of first function instances from the second function, a protocol session related message based on the first information.

Alternatively, or in addition, an apparatus may comprise means for receiving, from a first function instance of a set of first function instances at a second function, first information comprising an indication that a protocol session between the first function and the second function is controllable by different instances of the set of first function instances and providing, from the second function, a protocol session related message to one of the set of first function instances based on the first information.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising: at least one processor and at least one memory including a computer program code for a session management function, the at least one memory and computer program code configured to, with the at least one processor, cause the apparatus at least to:

provide, from a first instance of the session management function to a user plane function, first information for the user plane function to use to send a protocol session related message, the first information comprising: an indication that a packet forwarding control protocol session between the first instance of the session management function and the user plane function is controllable by any instance of the session management function in a set of instances of the session management function including the first instance of the session management function; and at least one of: a fully qualified domain name or identifier associated with the set of instances of the session management function; and an identifier or internet protocol address of a second instance of the session management function in the set of instances of the session management function; and receive, at the first instance of the session management function from the user plane function, the protocol session related message.

2. The apparatus according to claim 1, wherein the at least one memory and computer program code are further configured to, with the at least one processor, cause the apparatus to provide the first information in a protocol association procedure.

3. The apparatus according to claim 1, wherein the indication is a flag.

4. The apparatus according to claim 1, wherein the second instance of the second management function instance is a backup of the first instance of the session management function.

5. The apparatus according to claim 1, wherein the at least one memory and computer program code are further configured to, with the at least one processor, cause the first instance of the session management function instances to provide a request to update or release a protocol session association.

6. The apparatus according to claim 1, wherein the at least one memory and computer program code are further configured to, with the at least one processor, cause the apparatus to provide the first information in a protocol session establishment or modification request.

7. The apparatus according to claim 6, wherein the first information is included in a control plane fully qualified session identifier.

8. The apparatus according to claim 6, wherein the second instance of the session management function is a preferred instance of the session management function.

9. The apparatus according to claim 8, wherein the identifier of the second instance of the session management function comprises an IPv4 or IPv6 address.

10. The apparatus according to claim 6, wherein the first information comprises a null IPv4 or IPv6 address to indicate that there is no preferred instance of the session management function.

11. The apparatus according to claim 6, wherein the at least one memory and computer program code are further configured to, with the at least one processor, cause the first instance of the session management function to provide a request to modify or delete a protocol session.

12. The apparatus according to claim 1, wherein the at least one memory and computer program code are further configured to, with the at least one processor, cause the first instance of the session management function to provide a request rejection to the user plane function, the request rejection comprising an indication of the first instance of the session management function.

13. The apparatus according to claim 1, wherein the at least one memory and computer program code are further configured to, with the at least one processor, cause the first instance of the session management function to setup a single protocol association with the user plane function.

14. A method comprising:
providing, from a first instance of the session management function to a user plane function, first information for the user plane function to use to send a protocol session related message, the first information comprising: an indication that a packet forwarding control protocol session between the first instance of the session management function and the user plane function is controllable by any instance of the session management function in a set of instances of the session management function including the first instance of the session management function; and at least one of: a fully qualified domain name or identifier associated with the set of instances of the session management function; and an identifier or internet protocol address of a second instance of the session management function in the set of instances of the session management function; and
receiving, at the first instance of the session management function from the user plane function, the protocol session related message.

15. The method according to claim 14, further comprising providing the first information in a protocol association procedure.

16. The method according to claim 14, wherein the indication is a flag.

17. The method according to claim 14, wherein the second instance of the second management function instance is a backup of the first instance of the session management function.

18. The method according to claim 14, further comprising causing the first instance of the session management function to provide a request to update or release a protocol session association.

19. The method according to claim 14, further comprising providing the first information in a protocol session establishment or modification request.

20. The method according to claim 19, wherein the first information is included in a control plane fully qualified session identifier.

21. The method according to claim 19, wherein the second instance of the session management function is a preferred instance of the session management function.

22. The method according to claim 21, wherein the identifier of the second instance of the session management function comprises an IPv4 or IPv6 address.

23. The method according to claim 19, wherein the first information comprises a null IPv4 or IPv6 address to indicate that there is no preferred instance of the session management function.

24. The method according to claim 19, further comprising causing the first instance of the session management function to provide a request to modify or delete a protocol session.

25. The method according to claim 14, further comprising causing the first instance of the session management function to provide a request rejection to the user plane function, the request rejection comprising an indication of the first instance of the session management function.

26. The method according to claim 14, further comprising causing the first instance of the session management function to setup a single protocol association with the user plane function.

* * * * *

UNITED STATES PATENT AND TRADEMARK OFFICE
CERTIFICATE OF CORRECTION

PATENT NO. : 11,838,120 B2
APPLICATION NO. : 17/607935
DATED : December 5, 2023
INVENTOR(S) : Bruno Landais et al.

Page 1 of 1

It is certified that error appears in the above-identified patent and that said Letters Patent is hereby corrected as shown below:

In the Claims

In Column 24, Line 37, Claim 5, delete "function instances" and insert -- function --, therefor.

Signed and Sealed this
Twenty-seventh Day of August, 2024

Katherine Kelly Vidal
Director of the United States Patent and Trademark Office